(12) United States Patent
Albert

(10) Patent No.: US 6,835,041 B1
(45) Date of Patent: Dec. 28, 2004

(54) HIGH CAPACITY BULK MATERIAL TRANSPORTATION AND DISCHARGE METHOD AND SYSTEM

(75) Inventor: Mitchell E. Albert, Englewood, CO (US)

(73) Assignee: Bulk Unloading BA, LLC, Mount Joy, PA (US)

( * ) Notice: Subject to any disclaimer, the term of this patent is extended or adjusted under 35 U.S.C. 154(b) by 0 days.

(21) Appl. No.: 10/292,561

(22) Filed: Nov. 12, 2002

(51) Int. Cl.⁷ .................................. B65G 67/00
(52) U.S. Cl. ............... 414/386; 414/384; 105/241.5
(58) Field of Search ............... 414/373, 354, 414/355, 356, 376, 384, 386; 105/241.2, 275

(56) References Cited

U.S. PATENT DOCUMENTS

| | | |
|---|---|---|
| 483,360 A | 9/1892 | Ludlow |
| 1,810,639 A | 6/1931 | Burner |
| 2,195,772 A | 4/1940 | Farrell |
| 2,405,696 A | 8/1946 | Hoelzgen |
| 2,936,085 A * | 5/1960 | Schnaitter et al. .......... 414/386 |
| 3,358,858 A | 12/1967 | Zabel, Jr. |
| 3,583,335 A | 6/1971 | Schilf et al. |
| 3,667,191 A | 6/1972 | Nagy |
| 3,667,400 A | 6/1972 | Damy |
| 3,964,791 A | 6/1976 | Griffis |
| 4,051,970 A | 10/1977 | Ramsey |
| 4,154,170 A | 5/1979 | Williams |
| 4,407,202 A | 10/1983 | McCormick |
| 5,256,023 A | 10/1993 | Patrick et al. |
| 5,299,508 A | 4/1994 | Connelly |
| 5,393,187 A | 2/1995 | Seymour |
| 5,402,874 A | 4/1995 | Dahlin et al. |
| 5,407,309 A | 4/1995 | Hesch et al. |
| 5,718,550 A | 2/1998 | Lanigan, Sr. et al. |
| 5,967,735 A | 10/1999 | Smart et al. |
| 6,192,804 B1 | 2/2001 | Snead |
| 6,412,422 B2 | 7/2002 | Dohr et al. |
| 2001/0015153 A1 | 8/2001 | Theruer et al. |
| 2002/0044858 A1 | 4/2002 | Barry |
| 2002/0073882 A1 | 6/2002 | Howard et al. |

FOREIGN PATENT DOCUMENTS

| | | | | |
|---|---|---|---|---|
| DE | 340274 | * | 5/1918 | ............... 414/386 |
| DE | 875026 | * | 4/1953 | ............... 414/386 |
| DE | 1088429 | * | 9/1960 | ............... 414/386 |
| FR | 533696 | * | 3/1922 | ............... 414/386 |
| FR | 1121629 | * | 8/1956 | ............... 414/386 |
| SU | 718347 | * | 7/1980 | ............... 414/386 |

OTHER PUBLICATIONS

Aggregate Car Conversion for GTX Capital and RailtexInc., Brochure.

(List continued on next page.)

*Primary Examiner*—James R. Bidwell
(74) *Attorney, Agent, or Firm*—Marian J. Furst (57) ABSTRACT

System for transporting and unloading bulk materials, wherein a side-dumping container is mounted on a railroad car. A tilting mechanism at the unloading site tilts one side of the container on the car to unload bulk materials into a hopper through a top-hinged door on the other side of the container.

37 Claims, 8 Drawing Sheets

OTHER PUBLICATIONS

Herzog Cartopper Material Handler, downloaded from www.herzogcompanies.com/railcar_unloading website on Oct. 5, 2002.

"DIFCO Air Side Dump Cars: New Drop–End Cars, "DIFCO Inc., P.O. Box 238, Findlay, Oh, 45839 (Brochure).

"The Slot Machine," Georgetown Rail Equipment Company, downloaded from www.georgetownrail.com/prod02 website on Oct. 5, 2002.

"TransloadXpress™," downloaded from www.graniterock.com/products/transloadxpress website on Oct. 5, 2002.

"Compton Railcar Elevator" (Brochure).

The Grex Dump Train™ Georgetown Railroad Equipment Company, 701 E. University, Georgetown, Texas 78626 (Brochure and web page download).

"Rotary Coal Tipple," downloaded from www.lionel.com/Products/Catalogs/cat–2001–C–2/pgs–46–47 on Oct. 5, 2002.

"Garbage trains take to the rails," downloaded from www.j-mission–eu.be/interest/gartra website on Oct. 5, 2002.

"The Hulett Ore Unloaders," downloaded from junior.apk.net/~cam/huletts website on Oct. 5, 2002.

* cited by examiner

HIGH CAPACITY BULK MATERIAL TRANSPORTATION AND DISCHARGE METHOD AND SYSTEM

FIELD OF THE INVENTION

The present invention relates generally to a system for transporting bulk materials via a railway and for discharging the bulk materials at an unloading site, and more particularly to a railroad car and container for transporting bulk materials and a system for discharging the materials from the container.

BACKGROUND OF THE INVENTION

At present, the only remaining viable mining industries in the United States are the coal and aggregate industries, accounting for 45 percent and 40 percent of US mines, respectively. The coal industry produces about 1.2 billion tons/year, of which about 75 per cent is shipped to market via railways. Coal sells for about $5/ton FOB at the mine in the western United States and about $20/ton in the eastern United States. However, delivered costs have been reported at about $15–$30/ton, with the western railroads receiving $0.012–$0.016/ton mile freight rates. In comparison, the aggregate industry produces about 3 billion tons/year, of which only about 6 percent is shipped to market via railways. Aggregate sells at a mine for the same average price as Wyoming coal, around $5/ton. The aggregate products are typically shipped 25–200 miles to market at $0.08–$0.14/ton mile or $2–$28/ton by trucking. Average western United States railroad non-coal mineral freight rates of around $0.0258/ton mile have been reported. Thus, delivery of aggregate via railways could compare quite favorably with delivery by truck.

These statistics suggest that the railroads are servicing the coal industry far more effectively than the aggregate industry. Indeed, the railroad industry has shown limited interest in the aggregate industry due to a perception that transporting aggregate would be less profitable than transporting coal because aggregate is shipped for shorter distances and has a lower delivered price than coal. As a result, railroads charge higher aggregate freight rates, and aggregate shippers are uncertain as to how to use railroads effectively.

In particular, the lack of an efficient railroad car for transporting aggregate and the lack of an efficient way to unload or discharge aggregate from existing cars are considered to be major deterrents to the increased use of railroads for shipping aggregate. At present, the average turnaround time for railroad cars known in the art is about 21 days. However, a viable large volume viable commercial system transporting materials over distances up to about 200 miles would need to have turnaround times of one to three days Although 1–3 day turnaround times are achievable with some existing equipment, such short times have been achieved only for limited size material and with large capital equipment and operating costs.

In one fast and effective system for transporting and dumping coal, the coal is shipped in car unit trains pulled by several high horse power locomotives. These trains may include 100 or more railroad cars, with each car carrying about 100–115 tons. Commonly, aluminum rotary dump cars are used. These cars are equipped with special swiveling couplers and are unloaded by being turned upside down. The unloading facilities used with these cars include rotary dumps that engage the car and track to rotate them on an axis through the couplers. Typically, large concrete silos are used to load such trains. The locomotives cost over $1.5 million each, the rotary dump cars cost over $50,000 each, and the construction costs for the rotary dumps and loading silos are several millions of dollars.

However, rotary dump systems such as those used for coal are much too costly for aggregate applications. Further, most existing cars designed for hauling coal are not suitable for hauling aggregate due to the significantly greater density of aggregate, approximately twice the density of coal Crushed coal has a density between about 40 and about 54 pounds/cubic foot, while crushed rock has a density of between about 94 and 100 pounds/cubic foot.

A variety of systems and types of railroad cars have been used for transporting bulk materials such as aggregate. The predominant type of car is an open top bottom dump hopper car, constructed of steel. Because these cars are emptied by dumping from the bottom, expensive permanent facilities are required beneath the railroad tracks to receive the dumped bulk materials. Typically, these facilities include large, rail-supporting I beams suspended over permanent steel hoppers, all of which are mounted in thick, high-strength concrete foundations about 16–32 feet beneath the railroad tracks. Once built, such facilities are never moved unless closed down, and then only the hopper can be salvaged. The concrete foundation must be abandoned or destroyed. Further, unloading smaller sized or wet bulk materials, which pack during transport, generally requires a device that vibrates the cars to dislodge and discharge the loads.

Numerous car designs have been proposed with different car lengths, different numbers of hopper doors, and using different types of doors in attempts to improve discharge rates and provide a system more compatible with using railroads instead of trucks for transport. One of the current predominant business strategies is to alter old steel cars designed for transporting coal by cutting a section out of the middle of the car to reduce the maximum cargo volume, along with decreasing the number of doors and making the slopes of the floor sheets steeper at the ends of the cars. These car modifications increase dumping efficiencies and train capacity by reducing the number of doors handled by employees, allowing rock to dump faster due to the steeper angles of the floor sheets at the ends, and creating shorter cars that fit on shorter sidings.

However, the hopper doors on existing cars generally do not accommodate material larger than about six inches in diameter, and often the maximum acceptable product diameter is less than three to four inches. These cars cannot handle many aggregate industry products that have larger particle sizes, including some items, such as rip rap and decorative rock with diameters as large as two to four feet.

Other systems have been proposed and used to transport and dump aggregate materials. For example, the Car Topper-Herzog method uses a patented loader that sits on top of the sides of a gondola type car and digs material out of the car. The Difco type car and variations have a hinged body built into the car. An air or hydraulic ram system, incorporated into the car, is used to tilt the car body on the hinge for unloading to either side. In the slot or trough train, specialty gondola cars have doors at either end of each car in the train and are designed to allow a loader to drive through each car and on to the next car, digging out the material from the car floor and dumping the load along the side of the car. The dump train, developed by Georgetown Railroad, includes 16–18 open top hopper cars with a belt running through the cars to the end of the train, conveying material through the train cars to a special discharge car with a 50-foot conveyor boom to discharge anywhere on either side of the end of the train. In other applications, a belt is placed above the rail and beneath the car's door to transport dumped material away from the car and tracks.

Other major bulk materials shipped by rail include iron ore and garbage. Iron ore is usually unloaded in a manner similar to that of the first method, with dumping from open top bottom-dumping cars. Dumping occurs from a unit train onto huge piers extending out into the Great Lakes with large chutes directed into the holds of large lake vessels. However, due to the high density of the ore, 165 pounds per cubic foot, much smaller cars are required, and these cars have insufficient cubic foot capacity for practical use in transporting lower density bulk materials. At present, rail transport is used on a limited basis for garbage in ISO sized containers and specially modified box cars. The ISO sized containers, loaded with garbage, are delivered to a rail yard by truck, transported by rail to a destination, lifted off of the delivering railroad car, and usually placed on a truck for transportation to a receiving disposal pit, where the containers are tipped up from each truck and dumped from the end of the container.

The advantages and disadvantages of these existing systems for transporting and unloading aggregate materials are compared in Table I. All of the existing systems suffer from one or more of the following shortcomings:

high cost of implementation low capacity per train slow unloading labor intensive unloading undesirable longitudinal stockpiles inability to handle larger diameter materials Despite the fact that the US aggregate industry has an annual sales volume of 3,000,000,000 tons/year, making it more attractive than any other bulk freight commodity in the US or the world, there is a need for an improved system for railway transport of aggregate materials.

SUMMARY OF THE INVENTION

It is an object of the present invention to provide a system for transporting and unloading bulk materials, particularly materials having a density higher than that of coal but low enough for transportation in large volumes using existing railroad infrastructure.

It is another object of the present invention to provide a more economical system than is presently available for transporting and unloading bulk materials such as aggregate.

It is yet another object of the present invention to provide a system for transporting bulk materials that can carry and rapidly dump nearly any commercial size rock or bulk material.

It is a further object of the present invention to provide a system for transporting bulk materials that can handle a variety of particle sizes without the need for vibrating or shaking cars to unload packed materials.

It is yet a further object of the present invention to provide a system for transporting and unloading bulk materials that uses unit trains.

It is a still further object of the present invention to provide a system for transporting and unloading bulk materials with containers having improved rock holding and unloading capabilities, including the ability to rapidly move material of any size, unload the material rapidly, and carry the unloaded material rapidly away from the site of unloading.

It is still another object of the present invention to provide a system for transporting and unloading bulk materials that can operate with a minimum of labor.

One embodiment of the present invention comprises a system for transporting and unloading bulk materials. The system comprises at least one railroad car and a container for the bulk materials. The container comprises a bottom member having opposing first and second longitudinal sides and opposing ends, end walls secured to the ends of the bottom member, one side wall secured to the first longitudinal side of the bottom member and to the end walls, a structural support member connecting the end walls at or near the top of the end walls on the side opposing the side wall, and at least one bottom-opening door member hingedly attached to the structural support member and releasably engageable with the second longitudinal side of the bottom member. In addition, the system comprises mounting means for retaining or releasably attaching the container to the car adjacent the ends of the bottom or side member and maintaining the container on the car while the car is traveling. The mounting means provides for rotation of the container relative to the car along the second longitudinal side of the bottom member. The system also comprises tilting means for engaging the container at the side wall or adjacent the first longitudinal edge of the bottom member and a hopper assembly for receiving bulk materials unloaded from the container. The tilting means is located adjacent a railroad track upon which the car and container can travel, and the take away hopper assembly is located adjacent the railroad track in juxtaposition with the tilting means.

The car may be adapted for carrying the secured containers when loaded with a bulk material, and its bottom member may be substantially planar. The bottom member, end walls, side walls, and door member may be capable of carrying a selected bulk material without being deformed by forces exerted on the container by the bulk material. The door member of the container may form an entire wall of the container. Each end of the container may be secured on top of a bolster positioned over wheel/axle truck assemblies of the car. The container may have standard ISO dimensions, and the car may be dimensioned to receive such a standard ISO dimensioned container. Also, a plurality of containers may be secured to one car, or a plurality of containers may each be releasably secured to a different car.

Preferably, the tilting means is located on the opposite side of the railroad track from the hopper. The tilting means may comprise one or more hoists or one or more rams, and it may be operative to prevent the container from pivoting so far on the hinge that the car becomes imbalanced. The system may further comprise jacks for engaging the car on the hopper side and preventing the car from tipping with the container.

Another embodiment of the present invention comprises a container for transporting and unloading bulk materials via a railroad. The container comprises a bottom member having opposing first and second longitudinal sides and opposing ends; end walls secured to the ends of the bottom member; one side wall secured to the first longitudinal side of the bottom member and to the end walls; a structural support member connecting the end walls at or near the top of the end walls on the side opposing the side wall; and at least one bottom-opening door member hingedly attached to the structural support member and releasably engageable with the second longitudinal side of the bottom member.

The container may further comprise attachment means for releasably attaching the container to the car adjacent the ends of the bottom member, wherein the attachment means provides a hinge for rotating the container relative to the car along the second longitudinal side. It also may comprise means for engagement by a tilting device on the side wall or the bottom member. The container door may be releasably engageable with the second longitudinal side of the bottom member.

Another embodiment of the present invention comprises a ram assembly for tilting a railroad container on a railroad car. The assembly comprises a frame for supporting at least one ram; and at least one telescoping ram having a head adapted for engagement with a railroad container mounted on a railroad car. The ram assembly is operable from a position adjacent a set of railroad tracks to tilt the railroad container on the railroad car. The ram assembly may further comprise a hydraulic system for operating the ram or rams. The ram assembly may be portable.

Yet another embodiment of the present invention comprises a method for transporting and unloading bulk materials. The method comprises the steps of positioning a railroad car adjacent a tilting means and a hopper for receiving unloaded bulk materials. A container at least partially filled with a bulk material is releasably mounted on the car, and the container comprises a bottom member having opposing first and second longitudinal sides and opposing ends, the end walls secured to the ends of the bottom member, one side wall secured to the first longitudinal side of the bottom member and to the end walls, a structural support member connecting the end walls at or near the top of the end walls on the side opposing the side wall, and at least one bottom-opening door member hingedly attached to the structural support member and releasably engageable with the second longitudinal side of the bottom member. In an additional step, the tilting device is engaged with the container. Another step comprises disengaging the door member from the second side of the bottom member to allow the door to swing open by pivoting about the hinged attachment, thereby allowing a portion of the bulk material to push the door open and fall into the hopper. In yet another step, the container is tilted along the first longitudinal side to cause the container to pivot along the base of the second longitudinal side, thereby causing the remainder of the bulk material to fall into the hopper. Additional steps include lowering the container back onto the car and disengaging the tilting device from the container, re-securing the container to the car; and re-engaging the door to the second side of the container bottom.

In the method, the securing step may further comprise pre-selecting an orientation for the container on the car to allow subsequent unloading on a pre-selected side of the car. The tilting step may use a portable tilting device, and the tilting device may be selected from hoists and rams. Also, the hopper may be portable.

Optionally, there may be a plurality of railroad cars carrying containers of bulk material; and the steps of the method may be repeated with each of the cars. Also optionally, the method may include additional steps of obtaining a container for bulk materials; securing the container to a railroad car in a manner that the first longitudinal side of the container is releasable from the railroad car and the container is pivotable on an axis along the second side of the bottom member; engaging the door member with the second longitudinal side of the bottom member to prevent the door member from opening; loading a bulk material into the container; and transporting the loaded railroad car and container to a position on railroad tracks adjacent the tilting means and the hopper.

BRIEF DESCRIPTION OF THE DRAWINGS

These and other features, aspects, and advantages of the present invention will become better understood with reference to the following description, appended claims, and accompanying drawings, where:

DESCRIPTION OF THE PREFERRED EMBODIMENTS

In accordance with the present invention, a system is provided for transporting and unloading bulk materials by railroad using standard sized containers that can carry virtually any size materials and dump the cargo loads rapidly at locations that may not have permanent handling facilities for the dumped cargo. More particularly, the present system allows faster removal of aggregate from railroad cars for aggregate of any size. This system preferably comprises multiple railroad cars that are substantially identical in size and operation and that can be combined into car sets or unit trains. The system also includes containers with improved rock holding capacities and unloading capabilities relative to previously known cars and unloading systems. The containers have top-hinged doors along one longitudinal side.

In addition, the system comprises a mechanism to push or pull the other longitudinal side of the container up and cause the container to rotate about one or more hinges on the side having the door and a heavy duty portable hopper to receive material dumped from the containers. This system uses fast, inexpensive means to transfer bulk materials from the railroad car to a nearby stockpile, and it requires at most limited excavation and no beneath-track excavation or structures. These features allow loads to be dumped quickly, thereby facilitating equipment turnaround times as short as one to three days between the origin and destination.

As used herein, the term "unit train" refers to a dedicated train traveling, typically, between the same origin and destination and carrying the same type of commodity. By "dedicated" it is meant that the train's locomotives and cars are not available to any other customers. Aggregate-carrying trains, such as those contemplated in the present invention, are known to include between 25 and 100 cars, and typically include between about 40 and about 80 cars, and they often carry loads for relatively short distances in the range of 50–100 miles, although distances between about 6 and about 250 miles are known. However, longer or shorter trains could be used to transport and materials for longer or shorter distances in accordance with the present invention.

Also as used herein, the term "bulk materials" refers to any solid particulate material. However, the present invention is particularly useful for transporting relatively dense solid materials, such as rock, aggregate, sand, ore, clay, etc. It could also be used for transporting other materials, such as but not limited to chemicals or garbage. As used herein, the term "aggregate" refers to sized or unsized, graded or ungraded material from igneous, metamorphic or sedimentary geological origin as well as recycled building and construction materials.

As used herein, the term "ISO" stands for "International Standards Organization," a group known in the art that establishes standards including technical specifications or other precise criteria to be used consistently as rules, guidelines, or definitions of characteristics, to ensure that materials, products, processes and services are fit for their purpose. The term "AAR" means American Association of Railroads.

Figure 1:
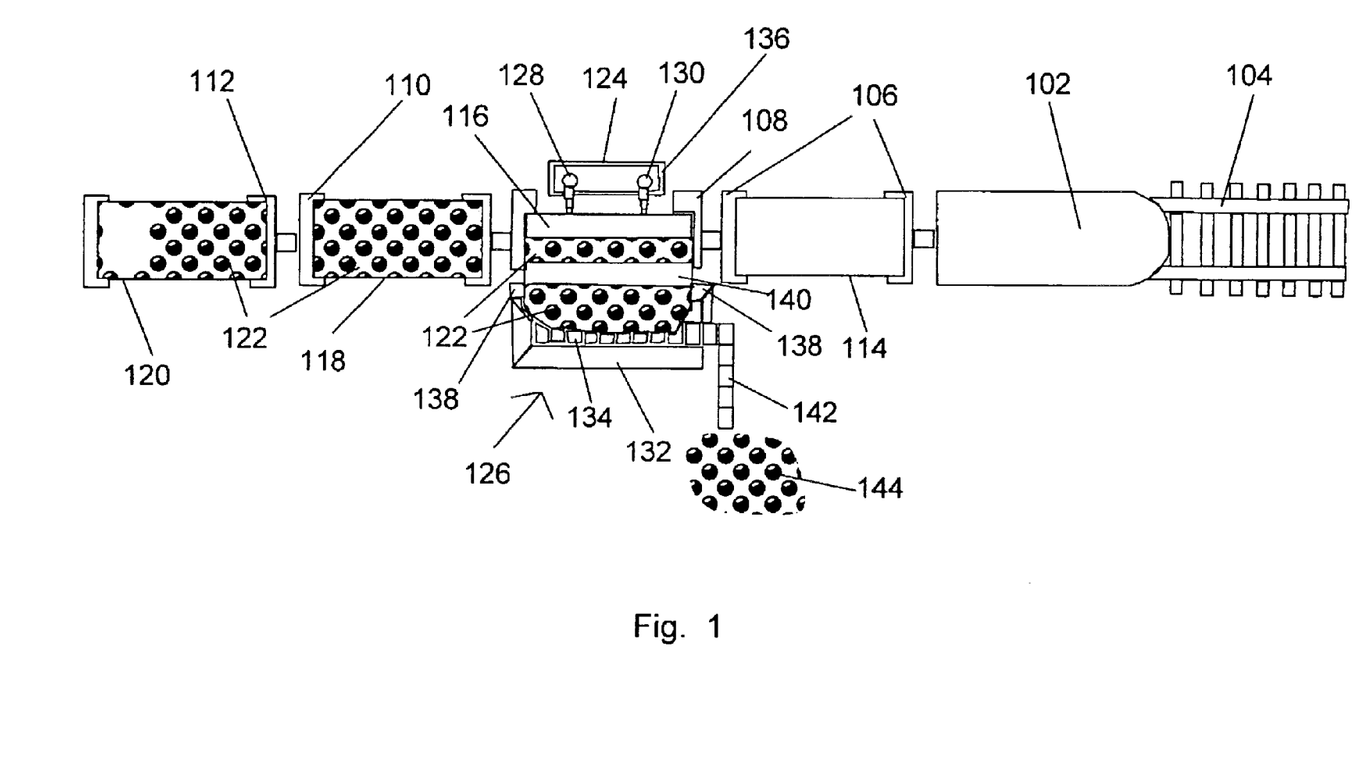
FIG. 1 is a top view of a system in accordance with the present invention.

A system in accordance with the present invention is shown generally in FIG. 1 at an unloading site for bulk materials. Locomotive 102 is stationed on railroad tracks 104. The first four cars 106, 108, 110, and 112 behind the locomotive are loaded with containers 114, 116, 118, and 120, respectively. As shown, containers 118 and 120 are filled with a bulk material 122, and container 114 has already been unloaded of its bulk cargo. The train has been spotted so that car 108 and container 116 are positioned between a ram assembly 124 and a hopper assembly 126 on opposite sides of the tracks 104. Container 116 is supported in a tilted position by rams 128 and 130, and its cargo is being unloaded into hopper 132 and transported on conveyor 134 through hopper 132 to one or more additional conveyor belts142 and a stockpile 144. The system can be used to transport and unload railroad cars containing almost any type of bulk material, although it is particularly suited for unloading and transporting rocks, sand, aggregate, and the like. The preferred particle size for such bulk materials can be from less than about one millimeter to greater than four feet in diameter, with preferred densities between about 20 pounds/cubic foot and about 200 pounds/cubic foot. Take away belt systems, such as 142, presently commercially available are limited to material having diameters less than about 16 inches. Larger diameter materials, could be dumped from the car onto the ground next to the tracks and then moved via other means, such as wheel or track loaders, or they could be transported by an appropriately designed conveyor belt.

Figure 8:
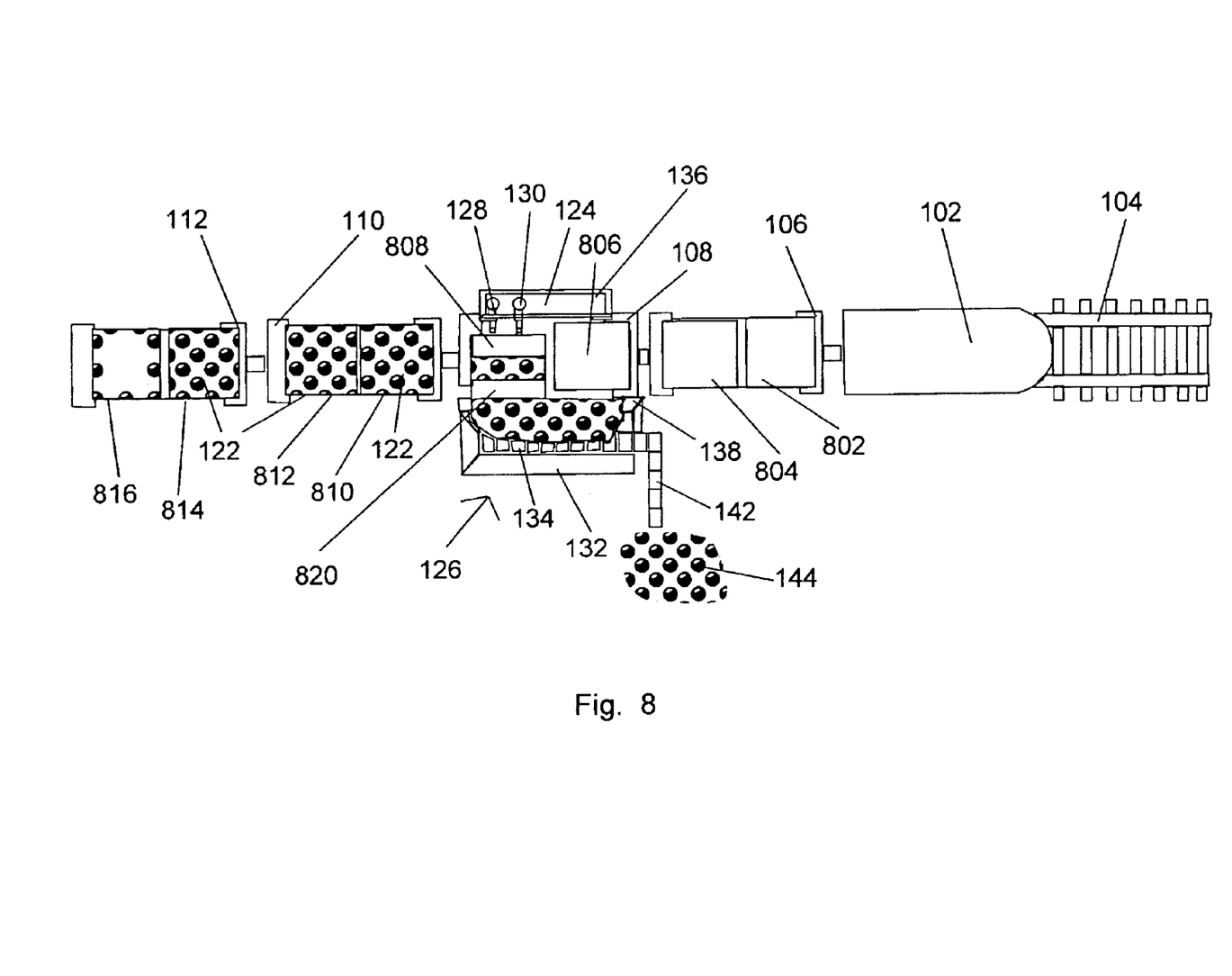
FIG. 8 is a top view of another system in accordance with the present invention.

In the system of the present invention, multiple containers may be mounted on each car, s shown in FIG. 8. Locomotive 102 is stationed on railroad tracks 104. The first four cars 106, 108, 110, and 112 behind the locomotive are loaded with containers 802,804, 806, 808, 810, 812, 814, and 816, respectively. The train has been spotted so that car 108 and container 808 are positioned between ram assembly 124 and hopper assemgly 126, similar to the positioning of car 108 and container 116 in FIG. 1. As shown, containers 810, 812, 814, and 816 are filled with a bulk material 122, and the bulk cargo has already been unloaded from containers 802, 804, and 806. Container 808 is supported in a tilted position by rams 128 and 130 with door 820 partially open, and its cargo is being unloaded into hopper 132 and transported on conveyor 134 through hopper 132 to one or more additional conveyor belts 142 and stockpile 144.

In accordance with the present invention, a spine or flat bed type of railroad car may be used. The car should have features that allow the cargo containers of the present invention to be positioned on the car and secured to it, preferably with common attachment methods known in the art. Flat racks may be used on top of the cars to support the loads to be carried. Preferably, the spine or flat bed railroad cars are standard cars like those currently in use, having either 263,000 or 286,000 pound gross load truck assemblies and other standard structural features. Either new cars can be manufactured for use in accordance with the present invention, or existing cars can be used with standard modifications for securing the containers as described below. Preferably, the cars are configured so that 20-foot, 40-foot, 45-foot, or 48-foot ISO containers can be positioned with the container ends centered over truck assemblies. When not used in the application described herein, the cars could be used for single or double stack regular intermodal railroad service for ISO containers hauling any standard intermodal commodity.

It is desirable to maximize the weight of the cargo without exceeding the load limits of standard railroad tracks and wheel/axle truck assemblies, and therefore, spine cars are preferred because they weigh less than flatbed cars and require less welding and assembly to produce. Preferably, the spine cars are configured with bolsters extending laterally from the longitudinal sill to support containers mounted on the cars. The contact area between the containers and the car should include either standard corner castings, twist locks, or retaining braces, as are known in the art, on one side to keep the containers on the cars. The other side of the containers is locked onto the railroad car with hinges. Although standard spine cars are available in lengths from 50 to 90 feet, it is preferred to use the shorter 50-foot cars in accordance with this invention, with bolsters directly over the wheel/axle truck assemblies and spaced to support 40-foot ISO sized containers.

In accordance with the present invention, cargo containers adapted for containing cargo weights up to or exceeding 230,000 pounds are provided. Preferably, the containers are open top containers having standard ISO lengths and widths. Although the containers may be 20 feet long ISO containers, 40-foot, 45-foot, or 48-foot ISO containers are more preferred. If 20-foot containers are used, two may be loaded end to end on each car, as shown in FIG. 8. The container width is preferably the ISO standard of 8 feet 6 inches. Assuming the desired cargo comprises aggregates, the height may be about seven to ten feet to maximize the cargo capacity that can be transported without exceeding the functional load limits on the cars' truck assemblies. It is expected that loads of aggregate or other rock or sand material may weigh as much as 230,000 pounds/40-foot container or 115,000 pounds/20-foot container.

Figure 2:
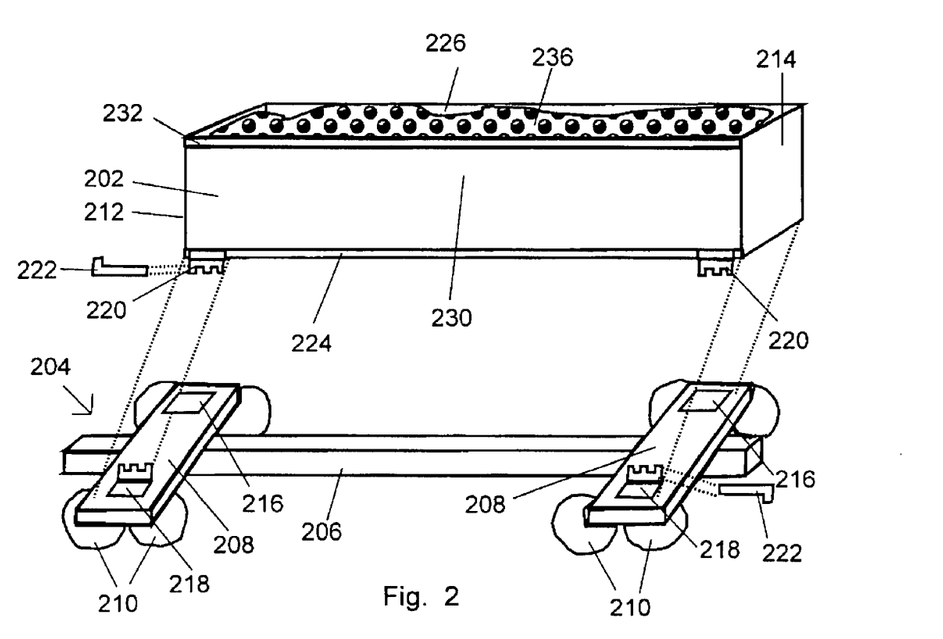
FIG. 2 is an exploded perspective view of one embodiment of a container and car in accordance with the present invention.
Figure 3:
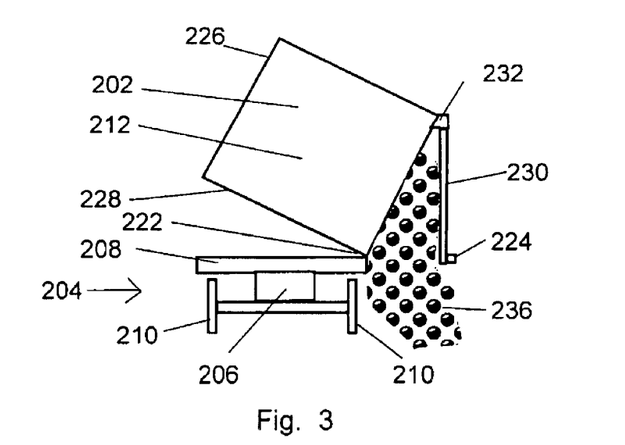
FIG. 3 is an end view of a container and car in accordance with the present invention, showing the container tipped on a longitudinal axis for unloading.

One embodiment of a container of the present invention can be understood with reference to FIGS. 2 and 3. A container 202 is mounted on a spine car 204 with a sill 206 running the length of the car. Bolsters 208 have been mounted onto sill 206 over wheel truck assemblies 210. Container 202 has a length selected so that its end walls 212 and 214 can be positioned over the bolsters 208 and the wheel truck assemblies 210. Each bolster 208 has a standard mounting device 216 on one side and a first hinge portion 218 on the other side. Container 202 is equipped with a second hinge portion 220 that cooperates with a first hinge portion 218 on one of the bolsters. Removable or permanent pins 222 connect the first and second hinge portions 218 arid 220 to form hinges so that when mounted on car 204, container 202 can pivot on bottom edge 224. Container 202 has a first longitudinal wall 226 that is fixed to end walls 212 and 214 and to one of the long edges of the container bottom 228. A door 230 is hinged along support member 232 and includes a locking mechanism along its bottom edge 224. As shown in FIG. 2, container 202 is filled with a bulk material 236.

As shown in FIG. 3, container 202 pivots about the hinge formed by hinge portions 218 and 220 and pins 222. When door 230 is unlocked, it is free to swing open and allow the loaded bulk material 236 to slide out of container 202. It should be noted that the support member 232 could include a panel extending downward from the top of container 202 forming a partial wall at the top of the container, with a top-hinged door hung from the lower edge of the panel. This arrangement could provide additional structural strength to the container and may be particularly useful when the anticipated load height is less than the height of the container and packing or jamming of the bulk materials inside the container is unlikely. Alternatively, two or more top-hinged doors could be hung side-by-side from the support member 232.

As shown in FIGS. 2 and 3, container 202 has a flat bottom and the general shape of a rectangular box when door 230 is closed. A flat container floor, such as floor 228 in FIG. 3, keeps the center of gravity of the load low and facilitates unloading as described below. Preferably, the floor is a heavy duty type steel such as an AR400 alloy or a similar heavy duty flat floor to allow abrasive heavy rock to be dropped onto the floor when loaded from 12 feet or more above the floor. However, other floors could be used. Also preferably, the container 202 has a reinforced frame, such as with heavier or stronger steel and/or one or more reinforcing bands around the container to hold the increased cargo loads of up to 230,000 pounds in a 40' long container. Optionally, the container 202 may be provided with a removable cover, not shown.

Containers in accordance with the present invention may be mounted on railroad cars by any method known in the art in a manner that allows a container to be tipped on an axis along the edge of the container floor as shown in FIG. 3. ISO/AAR defined and approved connectors, such as twist locks that rest on car structural members protruding into the floor of the container, may be used for securing the non-hinged side of the container to a spine or flat bed railroad car. As shown in FIGS. 2 and 3, pin hinges could be used, with interfingering portions welded or otherwise secured to the container and the car bolster and connecting pins that are removable when the container is to be dismounted from the underlying car, similar to a standard door hinge. Alternatively, any other suitable hinge mechanism known in the art could be used.

It should be understood that for most applications, the user can determine which side of the train will be used for unloading in advance of transporting bulk materials. The cars and containers in a train can then be assembled with the container doors on the appropriate side. Thus, in general, only one side of each container need have a top-hinged door, and the attachment to the car need only provide for tilting along one hinge axis on the same side as the container door. However, it is within the scope of the invention to provide containers with doors on both longitudinal sides and hinged attachment mechanisms that allow for tilting the container to either side for unloading.

Containers in accordance with the present invention may be equipped with a releasable locking mechanism, to secure the top-hinged container door or doors in a closed position during freight loading and transport. Preferably, the lock mechanism is double locking for safety. Also preferably, the locking mechanism can be unlocked or released from one end on the door side of the container. Although any suitable locking mechanism known in the art could be used, it should preferably comply with safety regulations currently in force for United States railway operations that prohibit unloading procedures during which a worker must cross from one side of the train to the other. Thus, if the lock mechanism is to be manually operated, it should be operable from the same side of the train as the hopper. It is desirable that the lock mechanism is strong enough to withstand forces exerted on the door by the weight of the container cargo during loading and transit. An alternative to a manually operated locking mechanism could be an automatic compressed air or hydraulic locking mechanism. Also, other locking mechanisms could include a lever extension that passes underneath the car or container and is activated from the other side in conjunction with engagement of the container by a tilting device located alongside the railroad tracks. It should be understood that these are but a few examples of suitable locking mechanisms in accordance the present invention, and any suitable locking mechanism known in the art could be used.

The present invention also includes means for tilting the container by engaging the container on the side opposite from that where the cargo is to be unloaded. Any suitable tilting means known in the art could be used. For example, the tilting means could be one or more hoists and gantries pulling from a frame above the car or one or more rams pushing from below the car. If a tilting type hoist and gantry are used, the hoist could be hooked to the side of the container opposite the door side to tilt the container to an angle sufficient for the cargo to unload from the container, probably at about a 45 degree angle. The tilting means need not be permanently installed at the site where container loads are dumped. It may be desirable to include a means for preventing the car from tipping over if the container becomes imbalanced, such as by tilting farther than is necessary for unloading. Either a combination of one or more arms and one or more chain(s) on the lifting side or jacks on the door side of the container could be engaged under each of the 2 end bolster ends to prevent the container from tipping too far as it is unloaded.

One embodiment of a ram assembly for tilting the containers in accordance with the present invention is illustrated generally as rams 128 and 130 in FIG. 1 and in more detail in FIG. 4. Telescoping multi-stage hydraulic ram 128 is mounted on a frame 136 located on a road bed next to the railroad tracks 104. The frame 136 may be made of steel, and the assembly of the frame and rams may be portable. For example, the frame 136 could be loaded onto a truck for transportation and unloaded at the site where it is to be used, or the frame could be integral with a truck or trailer. Prior to use of the ram assembly, it may be necessary to prepare the road bed by making it level with the correct elevation relative to the track elevation. Alternatively, the ram frame 136 may be bolted into the ground or a concrete foundation, which may comprise reinforced concrete. It is desirable that the ram assembly also includes a leveling mechanism such as setting bolts, not shown, which may also secure it to the foundation.

As shown in FIG. 1, two rams 128 and 130 are used. Preferably, the rams are separated along the frame 136 by a distance selected to place the rams near the ends of a container 116 for unloading. For example, if the container 116 is 40 feet long, the rams 128 and 130 could be about 30 feet apart. Also, it is possible to use one, three, or more rams to lift a container. The equipment needed to operate the rams, such as one or more hydraulic reservoirs, an independent engine, and other hydraulic components as are found in hydraulic systems known in the art, may also be mounted on the frame, but are not shown in FIGS. 1 and 4. Each ram 128 has a base portion 402 and two telescoping stages 404 and 406 and terminates in a head 408 suitable for engaging with an engagement element on the container to be tilted. In the illustrated embodiments, ram head 408 is wider than the end of stage 406 to which it is attached.

Figure 4A:
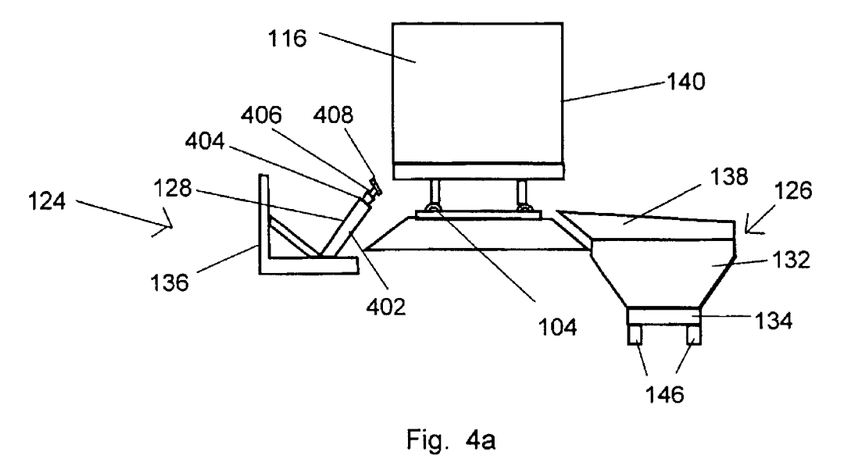
FIGS. 4a-d shows the system of the present invention as viewed from the end of a railroad car and container, with the car spotted for unloading in FIG. 4a, a tilting ram positioned to tilt the container in FIG. 4b, the container door open in FIG. 4c, and the container tilted for complete unloading in FIG. 4d.
Figure 4B:
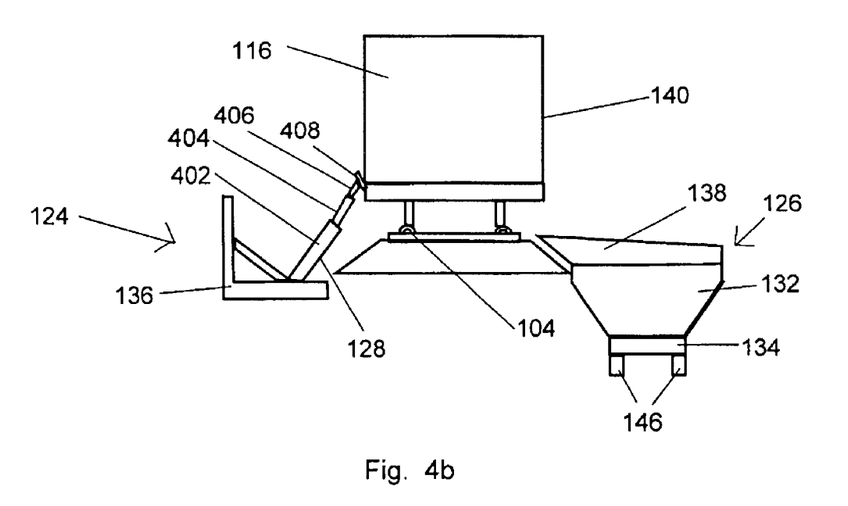
Figure 4C:
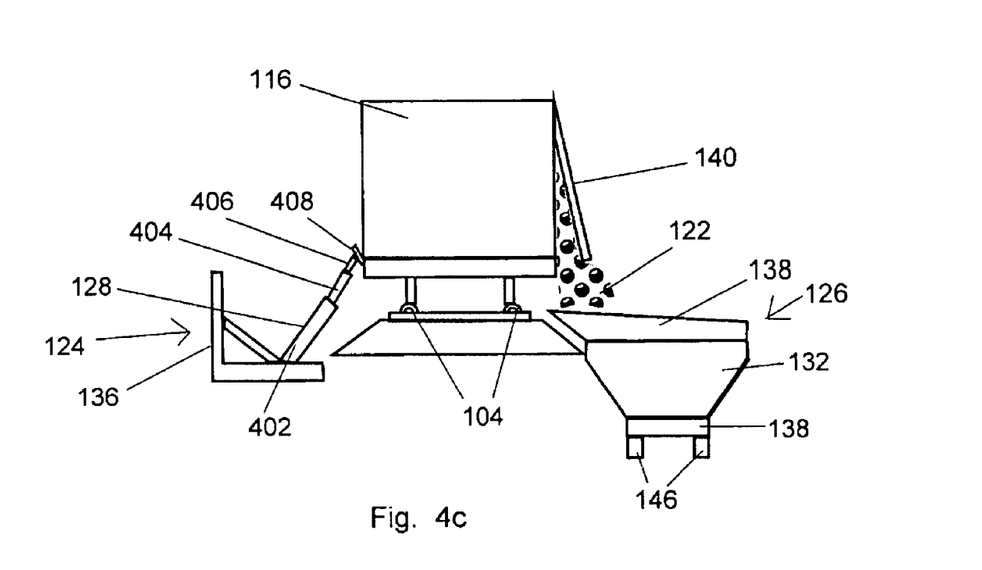
Figure 4D:
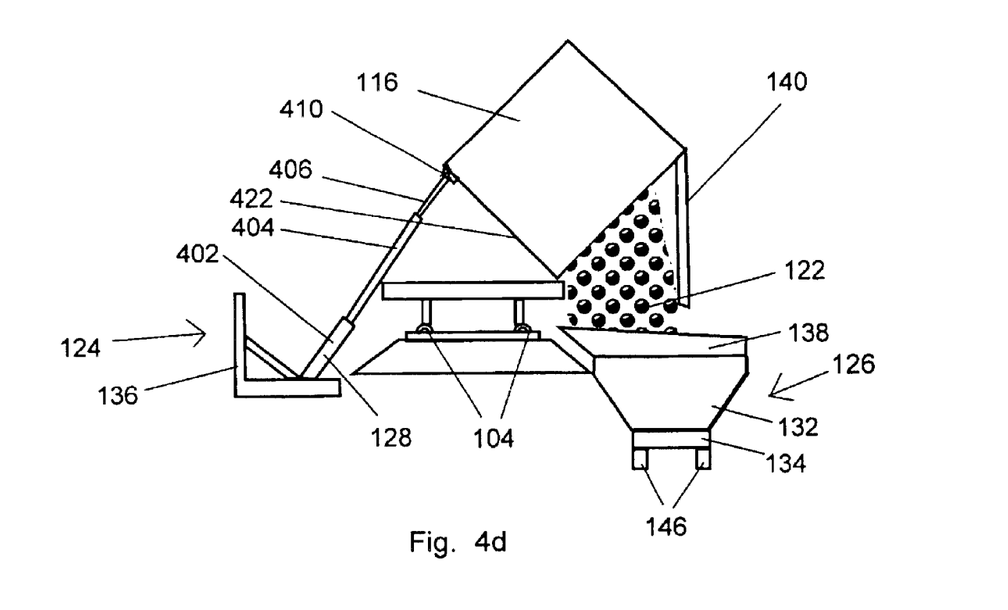
Figure 5A:
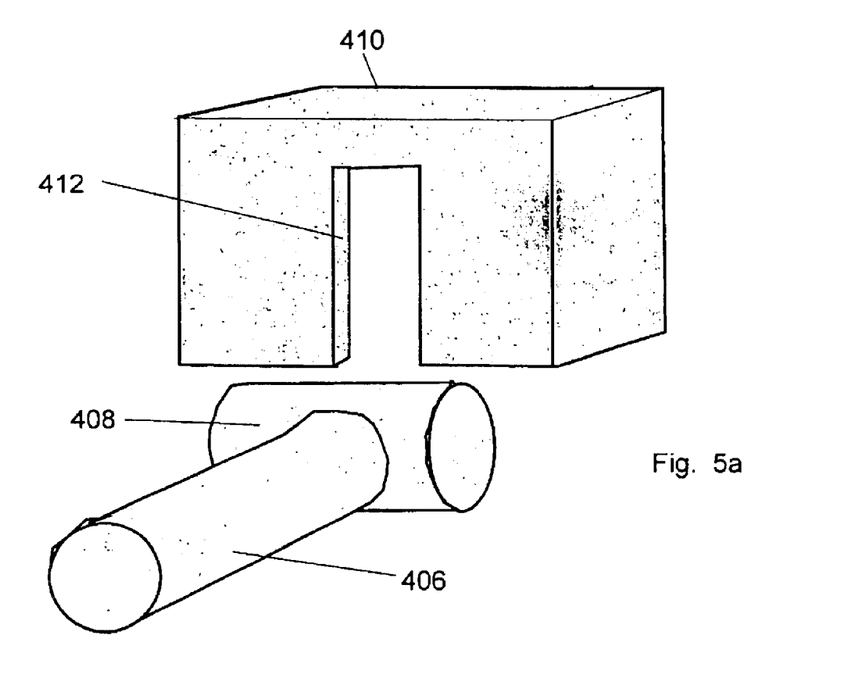
FIG. 5a is a detailed perspective view of one embodiment of the head of a tilting ram and a plate on a container with which the head engages to tilt the container.
Figure 5B:
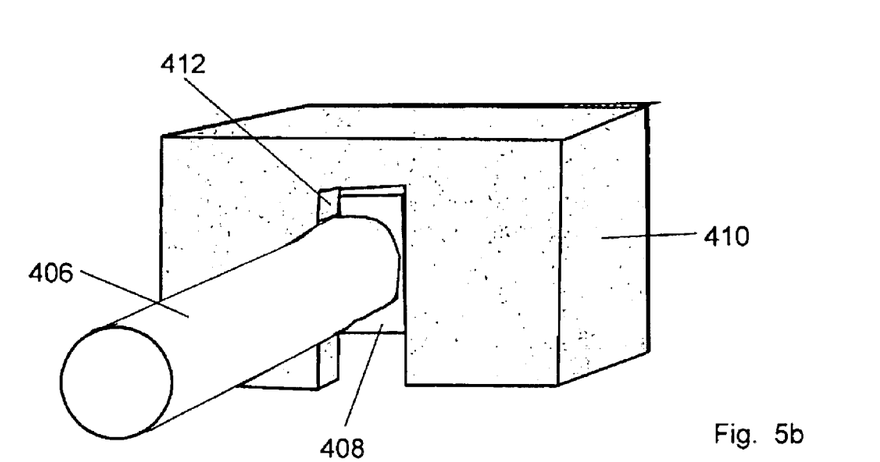
FIG. 5b is a detailed perspective view of the ram head of FIG. 5a engaged with the plate.

One possible mechanism for engaging ram head 408 is illustrated in FIGS. 4d and 5. The ram 128 extends diagonally upwards from the rail level to the bottom of the container 116. As shown in FIG. 5a, ram head 408 comprises a solid cylinder having a width greater than the width of the end of rain stage 406 to which it is attached. Container 116 is equipped with one or more slotted receptacles 410 located on the bottom of the container. Alternatively, a receptacle could be located on the wall of the container near the bottom of the container. The slot 412 is wide enough to accommodate the end of the ram stage 406 below the head 408, but it is narrower than the head 408. Extension of the ram 128 in the appropriate direction causes the head 408 to contact the container 116 just underneath the slotted receptacle 410. When ram 128 is partially extended, head 408 is positioned so that it can slide into the slot 412 in the receptacle 410 until the ram head 408 is securely engaged with the container, as shown in FIG. 5b. As the ram 128 is extended further, it tilts the container 116 with which it is engaged, and the container pivots along the far side 420 of the container bottom 422 bottom, as shown in FIG. 4*d*. The engagement of the ram head 408 in the slotted receptacle 410 stabilizes the container so it can pivot only as far as it is pushed by the ram 128, preventing the container 116 from tipping over farther than is desired.

Any suitable type of ram with any number of stages could be used. One suitable type of ram for use in the present invention is a Parker two- or three-stage ram capable of extension to a length sufficient to tilt a car-mounted container to an angle where the container load will exit the container under gravitational force. Another suitable type of ram is a HYCO 3- to 5-stage ram. Preferably, for typical car heights above a railroad bed, the ram mechanism and head should not extend above the height of the rail and should not extend within five feet of the center of track. The ram would first extend about 40 inches from the top of rail to the bottom of the container to engage the container. With a standard rail width of 4.5 feet and a standard ISO container width of 8.5 feet, the ram should be capable of extending an additional 12–13 feet to tilt the container sufficiently to dump the container contents into a hopper.

Figure 6:
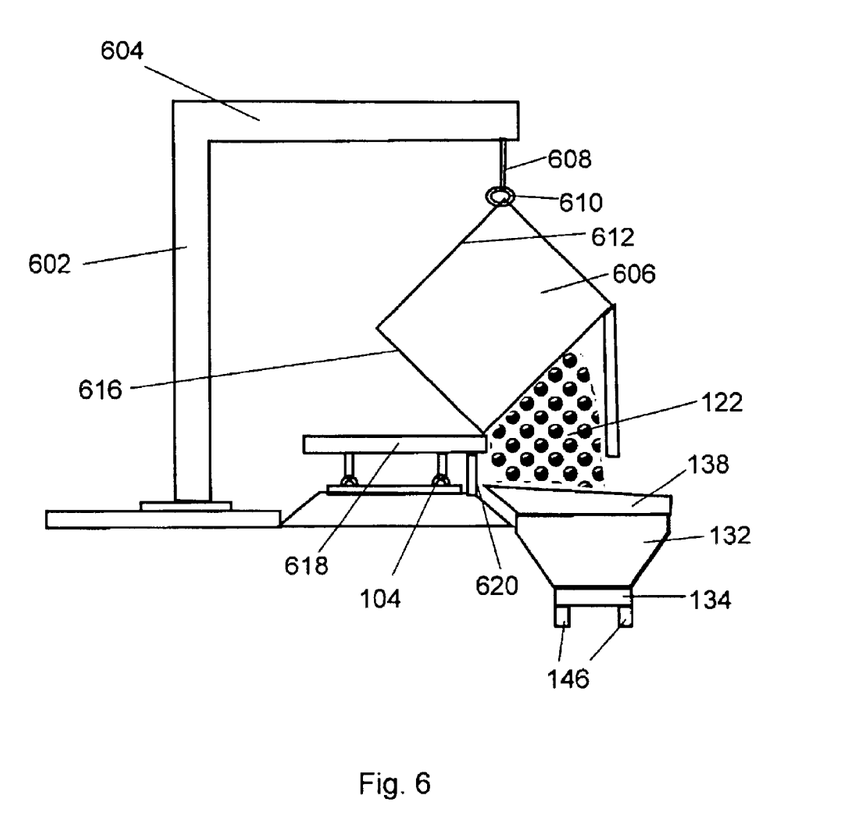
FIG. 6 shows another embodiment of the system of the present invention as viewed from the end of a railroad car and container.

An alternative tilting device is shown in FIG. 6, with hoist 602 and gantry 604 tilting container 606 by means of a chain or cable 608 hooked through an eye 610 at the top of container 606 at or near the top of longitudinal side wall 612.

Preferably, the tilting means and the mechanism by which it engages the container are designed to prevent the container from tilting farther than necessary to unload the container cargo. If the container tilts too far, it may unbalance the underlying car and also tilt the car, which is undesirable. In other embodiments of the present invention, it may be desirable to use one or more jacks or other stabilizing devices known in the art to prevent the car from tipping. For example, jacks could engage the hopper side of the car.

In accordance with the present invention, a hopper/conveyor system is provided at the unloading site for transporting dumped bulk material to a stockpile or other position away from the railroad tracks. Prior to placing the hopper 132 in position to receive cargo unloaded from railroad car containers, it may be desirable to prepare the unloading site. For example, earth may be excavated from the site with a dozer/loader, and concrete blocks could be placed in the excavated area to support the adjacent railroad roadbed and the cargo receiving take away hopper, particularly if it is to remain at the unloading site for an extended period of time. These blocks could be either left in place or removed when the site is no longer in use.

Suitable hoppers are known in the art, such as trucks that contain self-unloading conveyor belts along the floor of the truck hopper. For example, the hopper may be built to contain about 60 tons of material at 95 pounds per cubic foot, with a length of about 39 to 42 feet, a width that allows legal transportation by rail and/or highway, and appropriate side boards to prevent spillage and provide the needed volume. The hopper may be constructed of steel, and any type of suitable belt known in the art may be used.

Figure 7:
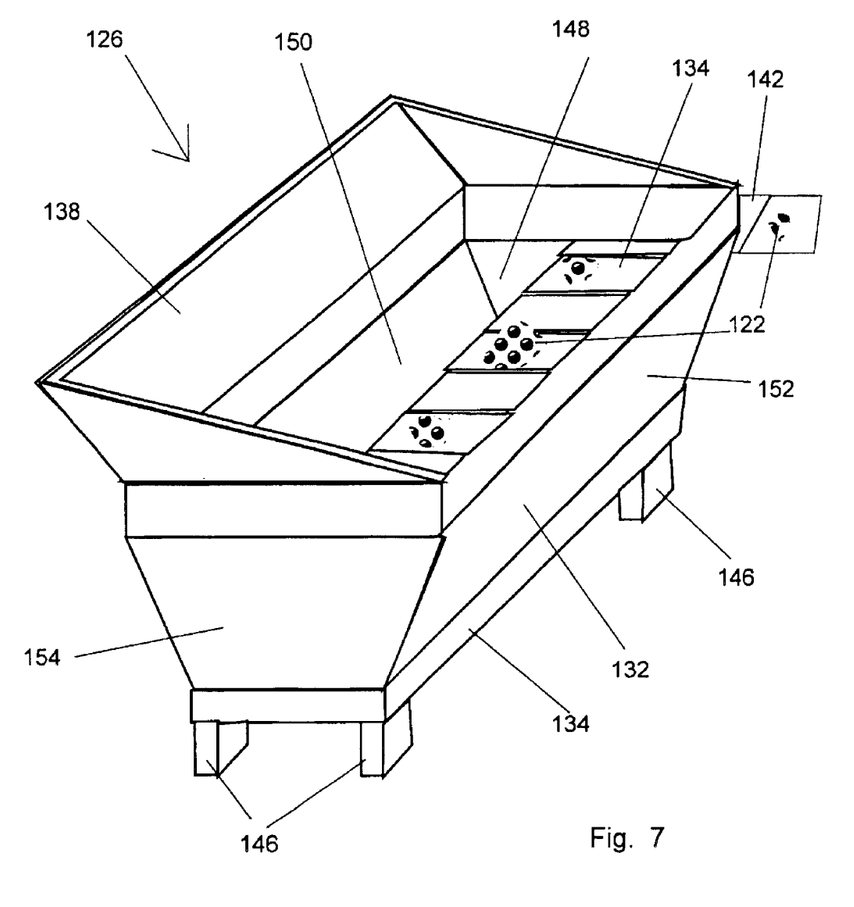
FIG. 7 is a perspective view of a hopper and conveyor belt assembly in accordance with the present invention.

An example of such a hopper/conveyor system is shown in FIGS. 1, 4, and 7. The hopper/conveyor system 126 comprises a hopper 132, which is seated on suitable blocks 146 or its original wheels and tires on a flat ground area, which may be paved. A conveyor belt 134 extends lengthwise through the bottom of hopper 132 and open end 148 of hopper 132 to discharge conveyed material 122. Optionally, there could be more than one belt 142 taking the dumped material any desired distance for stockpiling. Also optionally, the hopper 132 could include one or more baffles extending between the sides 150, 152 and 154 to lessen the impact of falling bulk materials hitting conveyer belt 134. A wing 138 is mounted lengthwise along the top of side 150 and end 154 and angled so that it extends somewhat underneath the edge of a car and container spotted alongside hopper 132 with its top no higher than the height of the rail.

It is desirable that vertical separation between the bottom of the hopper 132 and the bottom of the container 116 is not too great to minimize any site preparation of the unloading area, to prevent damage to the hopper and belt by large pieces of unloaded material, and to prevent the unloaded material from acquiring sufficient velocity to cause it to bounce or roll out of the hopper. Also, the hopper side 150 should be close enough to the bottom edge of the container 116 adjacent the container door 140 to allow the cargo 122 to be dumped into the hopper 132 without excessive spillage. It is preferable that the bottom of the hopper 132 is only about 9–12 feet beneath the bottom of the container floor, and the hopper edge 156 is about one to two feet away from the outside edge of the track rail 104, allowing the container side to extend over the wing 138 of the hopper 132. The side wing 138 adjacent to the railroad car and container should be tilted at about a 55 degree angle from horizontal to act as a chute for the cargo falling from the container to enter the hopper.

The method of the present invention can be understood with reference to FIGS. 1, 4, 5, and 6 and can be implemented when the cars and containers are available and the terminal operator has prepared the unloading site by setting up the unloading hopper assembly 126 at the terminal location along with transfer belts, one or more stacker(s), and any other equipment known in the art for handling the intended unloaded bulk material. If necessary, ground adjacent to the unloading spot/tracks may be excavated to accommodate the unloading hopper 132. The hopper 132 may be blocked in position. The terminal operator also sets up the tilting means, such as hydraulic ram assembly 124 or a hoist and gantry 602 and 604.

After the terminal site is prepared, a railroad train including at least one car 108 and a container 116 loaded with a bulk material 122 is spotted with the car 108 adjacent the lifting means, such as hydraulic rams 128 and 130 in FIG. 1 or hoist and gantry 602 and 604 in FIG. 6, and the hopper/conveyer system 126, as shown in FIGS. 1 and 4*a*. If the container 116 is physically attached to the underlying railroad car 108 on the side that is to be lifted, the container 116 is detached on that side to prepare it for rotation on the hinge or hinges located on the hopper side of the container and car.

After the train is spotted, if a hoist 602 and gantry 604 are to be used to tilt the car as shown in FIG. 6, they are connected to the container 606, such as with chain or cable 608 hooked to the top of the container on the side away from hopper system 126. The hoist 602 and gantry 604 then lift the edge of the container 606 to tilt the container 606 to an angle sufficient for the remaining contents 614 to flow into the hopper.

If one or more rams such as 128 and 130 are to be used to tilt the car, they are positioned with the heads adjacent the receptacle 410 at the bottom of the container 116 to engage with the container, as shown in FIGS. 4*b* and 5.

After the train is spotted, the container door 140 is unlocked, as shown in FIG. 4*c*. The weight of the load 122 in the container 116 pushes the door 140 open, allowing part of the load 122 to drop immediately from the container into the hopper 132. The remaining contents remain stacked in the container 116 with a slope determined by the angle of repose of the particular material.

Referring to FIGS. 4*d* and 6, after the first part of the load pushes the door open and empties from the container under gravity, the tilting means 128 or 602/604 is used to tilt the container 116 or 606 until the container floor 422 or 614 is held at an angle sufficient for the rest of the load 122 or 616 to flow from the container under gravitational force, probably no more than about 55 degrees from horizontal for most materials. It should be noted that the container's contents are emptied by tilting the container, but the car 108 or 618 underneath the container remains on the tracks 104 and is not tilted. In this regard, it may be desirable to stabilize the car 108 or 618, such as by providing a set of hydraulic jacks 620 under the car frame bolsters at either end on the car to support the car.

After the cargo 122 is unloaded into the hopper system 126, the container 116 or 606 is restored to its resting position on the car 108 or 618. Any locking mechanism that may be present is engaged to secure the container in place on car. The door 140 or 620 is also locked to the container bottom 422 or 616. The tilting means 128 or 602/604 is disengaged from the container 116 or 606. Any jacks or other devices used to stabilize the car are also removed or disengaged.

If there are additional containers to be unloaded, the train is moved to spot the next car, such as car 110 in FIG. 1, adjacent the lifting means, such as ram assembly 124, and hopper system 126, and the unloading process is repeated. The loading time could be decreased by using multiple pairs of rams or hoists and either a longer hopper or multiple hoppers to allow simultaneous dumping from more than one container. However, this alternative may be too costly to be practical, particularly when the unloading time is very short compared to the travel time between the source of the bulk materials and the unloading site.

During the unloading process, it may be necessary for human labor to perform several functions, such as observing the dumping and the hopper/belt/stacker operations and operating emergency shut off switches, if necessary. It is contemplated that human labor may also be needed to spot cars, possibly using locomotive remote gear, and/or to send radio messages to the train engineer regarding the car position. A person may be needed to disconnect and reconnect the container from the car on the non-hinged side. Human intervention may also be required to engage and disengage the rams or hoist, engage and disengage the bolster support jacks if they are used, to unlock and lock the container door lock on the dumping side, and/or to engage a restraining control device on the tilting side so the container doesn't tip further than allowed or tip the railroad car. It is contemplated that these tasks can be handled by one or, at most, two people during normal operations.

The system of the present invention is compared with prior art systems in Table I. With the system of the present invention, capital and operating costs for the car/container transport and unloading system for bulk materials, such as aggregate and other rock products, are expected to be significantly less than with previously available systems due to decreased infrastructure, decreased capital equipment costs, and decreased labor. In addition to their simplicity and their lower capital cost and speed of operation, the system in accordance with the present invention and its cars, containers, and other components are reliable, safe, and usable in other applications.

Cars using 286,000 pound truck assemblies for use with this invention weigh about 40,000 to 50,000 pounds, and 40-foot ISO sized reinforced containers weigh about 15,000 to 20,000 pounds, leaving a payload capacity of about 216,000 to 231,000 pounds. Any number of these cars, equipped with containers, can be combined into unit trains that are capable of hauling large quantities of bulk material. For example, an 80 car/container train could carry up to 9,200 tons of cargo.

In contrast to the railroad transportation system for aggregate materials that has been prevalent until now, which requires major excavation and construction beneath the tracks to accommodate bottom-dumping cars, the system of the present invention requires relatively little infrastructure and can be implemented as either a permanent or a temporary installation. Because the containers are tilted to an angle sufficient to dump their cargo via gravitational force, it is not necessary to provide shaking or vibration to aid in dumping.

The system of the present invention uses less equipment than in some previous methods. The cars, containers, rams, hoppers, belts, jacks, and equipment used in the dumping process may be readily available, requiring at most minor modifications of commercially available equipment for use with the side-dump containers of the present invention. The ground-based rams or hoists and the hopper and conveyor systems used in unloading the side-dump cars of the present invention may be portable and easily transported by road or railroad. The side dump containers and spine or flatbed car combination are less expensive than other new railroad and open top hopper, gondola, and rotary dump cars previously used for hauling bulk materials as contemplated with this invention. The car and container combination as contemplated with this invention are easily constructed and usable for transporting many materials other than rock and aggregate, and they can accommodate materials with larger particle sizes than has previously been possible. The estimated cost of a car and container in accordance with the present invention is about $25,000–$35,000.

Further, the relatively simple equipment used in and with the present invention is easy to maintain and requires minimal staff for operation. The system has been designed so that a single person may be able to handle the entire unloading process, including train and car spotting. In contrast, previously known unloading operations typically engaged 2 people in addition to a 2–3 person railroad crew. The reduced labor requirement of the present system also reduces operating costs.

The system of the present invention allows car spotting and container dumping in time intervals as short as 1 to 4 minutes/car, allowing much more rapid unloading and release of the empty train and thereby facilitating a faster equipment turnaround time for transporting loads from a quarry site to a dumping site. Faster spotting/dumping times could be obtained with more costly hopper take away belts. Shortening the time to unload trains reduces railroad employee overtime, assists in greater railroad employee availability, and helps coordinate railroad employee shift times.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention.

TABLE I

Prior art transportation and dumping systems

| Method | Description of Equipment | Vibration | Size material | Discharge Rate tons/hour | No. people required for unloading | Estimated cost for 1 million tons/year |
|---|---|---|---|---|---|---|
| Common method (prior art) | Open top hopper integral with car body; dumps via doors in bottom of car into hopper; hopper has 80–200 ton capacity with belt to move rock concrete foundation underneath tracks, requires large I-beams beneath rail to support train and hopper/belt assembly | Yes | <6–8 in. | 500–2,000 | 2–4 | $2,800,000 |
| Herzog (prior art) | Gondola or open top hopper integral with car; unloader uses sides of rail cars for support and digs out contents of cars; Material transferred directly to truck or stockpile on ground | No | <24 in. | 200–300 | 1–3 | $2,400,000 |
| Difco (prior art) | Railroad maintenance car, wider than normal car, needs special permission to use track; unloads using air or hydraulic cylinders to tip car hopper to either side to discharge rock; cars dump to side of tracks or road bed, could dump into hopper | No | Any | 2,000 | 2 | $8,700,000 |
| Trough/Slot Train (prior art) | Steel gondolas connected at both ends to other gondolas; front end loader moves from car to car, digging out contents and dumping over side; dumps beside train | No | Whatever loader handles | 500 | 2+ | $2,475,000 |
| Transload Xpress (prior art) | Open top hopper integral with car; dumps via doors in bottom of car onto belt between bottom of car and tracks; belt discharges into truck or stockpile; belt is portable | Yes | <3 in. | 300 | 2 | $2,400,000 |
| Rail Belt (prior art) | Open top hopper integral with car; dumps via doors on bottom of car onto belt between bottom of car and tracks; belt discharges into truck or to stockpile; belt is portable on ground | Yes | <3 in. | 300 | 2 | $2,400,000 |
| Belt Train (prior art) | Hopper/gondola type car, modified for belts running through each car; 16–18 cars/train; belts transport material from car to car lengthwise and out end of train; could dump into a hopper | No | 3 in. | 1,500–2,000 | 1 | $22,500,000 |
| Coal Rotary Dump (prior art) | Rotary dump hopper integral with car body; rotary dumps are turned upside down into hopper by large costly apparatus requiring major foundation and structure to hold and invert car | No | 3 in. | 3,000–5,000 | Several | |
| Iron Ore (prior art) | Small, bottom dump hopper integral with car frame; dumps via bottom of car onto costly piers/chutes loading boats | No | 1 in. | 2,000–4,000 | Several | |
| Garbage (prior art) | Removable container mounted on spine or flat bed car; gantry moves container between car and truck | No | Any | 300 | 2–4 | $3,650,000 |
| Present Invention | Flat-bottomed container on spine or flat bed car; dumps via top-hinged open side door and tipping container from opposite side into hopper with belt; no foundation necessary beneath tracks | No | Any | ≦4,000 | 1 | $1,765,000 |

What is claimed is:

1. A system for transporting and unloading bulk materials, the system comprising:

at least one railroad car;

a container for the bulk materials, comprising a bottom member having opposing first and second longitudinal sides and opposing ends, end walls secured to said ends of said bottom member, one side wall secured to said first longitudinal side of said bottom member and to said end walls, a structural support member connecting said end walls at or near the top of said end walls on the side opposing said side wall, and at least one bottom-opening door member hingedly attached to said structural support member and releasably engageable with said second longitudinal side of said bottom member;

mounting means for retaining or releasably attaching said container to said car adjacent said ends of said bottom or side member and maintaining said container on said car while said car is traveling, wherein the mounting means provides for rotation of said container relative to said car along said second longitudinal side of said bottom member;

tilting means for engaging said container at said side wall or adjacent said first longitudinal edge of said bottom member, said tilting means located adjacent a railroad track upon which said car and container can travel; and a hopper assembly for receiving bulk materials unloaded from said container, said hopper assembly located adjacent the railroad track in juxtaposition with said tilting means.

2. The system of claim 1, wherein said car is adapted for carrying said secured containers when loaded with a bulk material.

3. The system of claim 1, wherein said bottom member of said container is substantially planar.

4. The system of claim 1, wherein said bottom member, end walls, side walls, and door member are capable of carrying a selected bulk material without being deformed by forces exerted on said container by the bulk material.

5. The system of claim 1, wherein said door member of said container forms an entire wall of said container.

6. The system of claim 1, wherein each end of said container is secured on top of a bolster positioned over wheel/axle truck assemblies of said car.

7. The system of claim 1, wherein said tilting means is located on the opposite side of the railroad track from said hopper.

8. The system of claim 1, wherein said tilting means comprises one or more hoists.

9. The system of claim 1, wherein said tilting means comprises one or more rams, each ram including means for connecting that ram to said container.

10. The system of claim 1, wherein said tilting means is operative to prevent said container from pivoting so far on said hinge that said car becomes imbalanced.

11. The system of claim 1, further comprising jacks for engaging said car on the hopper side and preventing said car from tipping with said container.

12. The system of claim 1, comprising a plurality of containers, wherein each container is releasably secured to a different car.

13. The system of claim 1, wherein said car is dimensioned to receive a standard size ISO dimensioned container.

14. The system of claim 1, wherein said container has standard ISO dimensions.

15. The system of claim 1, comprising a plurality of containers secured to one car.

16. A container for transporting and unloading bulk materials via a railroad, said container comprising:
a bottom member having opposing first and second longitudinal sides and opposing ends;
end walls secured to said ends of said bottom member;
one side wall secured to said first longitudinal side of said bottom member and to said end walls;
a structural support member connecting said end walls at or near the top of said end walls on the side opposing said side wall; and
at least one bottom-opening door member hingedly attached to said structural support member and releasably engageable with said second longitudinal side of said bottom member.

17. The container of claim 16, further comprising attachment means for releasably attaching said container to said car adjacent said ends of said bottom member, wherein said attachment means provides a hinge for rotating said container relative to said car along said second longitudinal side.

18. The container of claim 16, further comprising means for engagement by a tilting device on said side wall or said bottom member.

19. The container of claim 18, wherein said means for engagement comprises a slotted plate.

20. The container of claim 16, further wherein said door is releasably engageable with said second longitudinal side of said bottom member.

21. A ram assembly for tilting a railroad container on a railroad car, said assembly comprising:
a frame for supporting at least one ram; and
at least one telescoping ram having a head adapted for engagement with a railroad container mounted on a railroad car;
wherein said ram assembly is operable from a position adjacent a set of railroad tracks, without using beneath-track structures, to tilt the railroad container on the railroad car.

22. The ram assembly of claim 21, further comprising a hydraulic system for operating said rain or rams.

23. The ram assembly of claim 21, wherein said ram head comprises a narrow portion attached to a main body of said ram and terminates in a wider portion extending beyond said narrow portion.

24. The ram assembly of claim 21, wherein said rain assembly is portable.

25. The ram assembly of claim 21, wherein said ram assembly is transportable on a road.

26. A method for transporting and unloading bulk materials, comprising the steps of:
a. positioning a railroad car adjacent a tilting means and a hopper for receiving unloaded bulk materials, wherein a container at least partially filled with a bulk material is releasably mounted thereon, and wherein said container comprises a bottom member having opposing first and second longitudinal sides and opposing ends, said end walls secured to said ends of said bottom member, one side wall secured to said first longitudinal side of said bottom member and to said end walls, a structural support member connecting said end walls at or near the top of said end walls on the side opposing said side wall, and at least one bottom-opening door member hingedly attached to said structural support member and releasably engageable with said second longitudinal side of said bottom member;
b. engaging said tilting device with said container;
c. disengaging said door member from said second side of said bottom member to allow said door to swing open by pivoting about said hinged attachment, thereby allowing a portion of the bulk material to push the door open and fall into said hopper;
d. tilting said container along said first longitudinal side to cause said container to pivot along the base of said second longitudinal side, thereby causing the remainder of said bulk material to fall into said hopper;
e. lowering said container back onto said car and disengaging said tilting device from said container;
f. re-securing said container to said car; and
g. re-engaging said door to said second side of said container bottom.

27. The method of claim 26, wherein:
said railroad car is one of a plurality of cars carrying containers of bulk material; and
steps a–g are repeated with each of at least one other of said container-carrying cars.

28. The method of claim 26, further comprising the steps of:
obtaining a container for bulk materials as described in claim 26a;
securing said container to a railroad car in a manner that said first longitudinal side of said container is releasable from said railroad car and said container is pivotable on an axis along said second side of said bottom member;
engaging said door member with said second longitudinal side of said bottom member to prevent said door member from opening;
loading a bulk material into said container; and
transporting said loaded railroad car and container to a position on railroad tracks adjacent said tilting means and said hopper.

29. The method of claim 26, wherein said securing step further comprises pre-selecting an orientation for said container on said car to allow subsequent unloading on a pre-selected side of said car.

30. The method of claim 26, wherein said tilting step comprises using a tilting device selected from hoists and rams.

31. The method of claim 26, wherein said tilting device is portable.

32. The method of claim 26, wherein said hopper is portable.

33. The system of claim 1, wherein said system is operable without any beneath-track structures to accommodate said tilting means or said hopper.

34. The system of claim 1, wherein said hopper assembly comprises a take away hopper.

35. The container of claim 16, having standard ISO dimensions.

36. The method of claim 26, wherein said tilting means and said hopper are located adjacent railroad tracks, and the tracks are supported without any beneath-track structures to accommodate said tilting means or said hopper.

37. The method of claim 26, wherein said hopper is a take away hopper.

* * * * *